United States Patent
Lagerqvist et al.

(10) Patent No.: US 11,616,622 B2
(45) Date of Patent: *Mar. 28, 2023

(54) NETWORK NODE AND METHOD FOR MANAGING TRANSMISSION OF CELL REFERENCE SYMBOLS

(71) Applicant: Telefonaktiebolaget LM Ericsson (publ), Stockholm (SE)

(72) Inventors: Tomas Lagerqvist, Stockholm (SE); Walter Müller, Upplands Väsby (SE); Christian Skärby, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 413 days.

This patent is subject to a terminal disclaimer.

(21) Appl. No.: 16/854,525

(22) Filed: Apr. 21, 2020

(65) Prior Publication Data

US 2020/0252173 A1    Aug. 6, 2020

Related U.S. Application Data

(63) Continuation of application No. 16/253,596, filed on Jan. 22, 2019, now Pat. No. 10,673,590, which is a
(Continued)

(51) Int. Cl.
*H04L 5/00* (2006.01)
*H04L 25/02* (2006.01)
*H04W 72/04* (2009.01)

(52) U.S. Cl.
CPC ............ *H04L 5/005* (2013.01); *H04L 5/0007* (2013.01); *H04W 72/042* (2013.01); *H04L 5/0073* (2013.01); *H04L 25/0226* (2013.01)

(58) Field of Classification Search
CPC ..... H04L 5/005; H04L 5/0007; H04W 72/042
See application file for complete search history.

(56) References Cited

U.S. PATENT DOCUMENTS 10,673,590 B2 *   6/2020   Lagerqvist .............. H04L 5/005
2012/0115485 A1   5/2012   Narasimha et al.
(Continued)

FOREIGN PATENT DOCUMENTS

CN    101860867 A    10/2010
CN    102948087 A    2/2013
(Continued)

OTHER PUBLICATIONS

International Search Report and Written Opinion dated Apr. 9, 2015 in International Application No. PCT/SE2014/050994, 11 pages.
(Continued)

*Primary Examiner* — Ronald B Abelson
(74) *Attorney, Agent, or Firm* — Rothwell, Figg, Ernst & Manbeck, P.C.

(57) ABSTRACT

A method performed by a network node for managing transmission of Cell Reference Symbols, CRS, wherein the network node operates one or more cells and the network node is configured to transmit the CRS in a first bandwidth mode. When the network node has identified a cell which is not actively serving any UEs, also referred to as an empty cell, the network node applies a reduced CRS bandwidth mode in the first cell in relation to the first bandwidth mode. By applying a reduced CRS bandwidth mode in the empty cell, the overall interference of the CRS from the empty cell is reduced, thereby enhancing the performance in cells actively serving UEs.

16 Claims, 3 Drawing Sheets

Related U.S. Application Data continuation of application No. 15/506,474, filed as application No. PCT/SE2014/050994 on Aug. 28, 2014, now Pat. No. 10,218,482.

(56) References Cited

U.S. PATENT DOCUMENTS

| | | |
|---|---|---|
| 2013/0281076 A1 | 10/2013 | Damnjanovic et al. |
| 2014/0036812 A1 | 2/2014 | Malladi et al. |
| 2014/0153448 A1 | 6/2014 | Ribeiro et al. |
| 2014/0241454 A1 | 8/2014 | Kim et al. |
| 2015/0078466 A1 | 3/2015 | Zhou et al. |
| 2015/0365890 A1 | 12/2015 | Rajendran et al. |

FOREIGN PATENT DOCUMENTS

| | | |
|---|---|---|
| CN | 201410175578.0 | 4/2014 |
| RU | 2518070 C2 | 6/2014 |
| WO | 2013138814 A1 | 9/2013 |

OTHER PUBLICATIONS

International Preliminary Report on Patentability dated Feb. 28, 2017 in international Application No. PCT/SE2014/050994, 8 pages.

Ericsson, "LTE Release 12—taking another step toward the Networked Society (Ericsson White Paper)", Retrieved from internet: URL:http://www.ericsson.com/mx/res/docs/whitepapers/wp-lte-release-12.pdf, Jan. 1, 2013, 12 pages.

Hoymann, C., et al., "A Lean Carrier for LTE", 2013 IEEE Communications Magazine, IEEE Service Center, Piscataway, US, Feb. 1, 2013, pp. 74-80, XP011493785.

\* cited by examiner

NETWORK NODE AND METHOD FOR MANAGING TRANSMISSION OF CELL REFERENCE SYMBOLS

CROSS-REFERENCE TO RELATED APPLICATIONS

This application is a continuation of U.S. patent application Ser. No. 16/253,596, filed on Jan. 22, 2019 (status pending), which is a continuation of U.S. patent application Ser. No. 15/506,474, having a section 371(c) date of Feb. 24, 2017 (issued as U.S. Ser. No. 10,218,482 on Feb. 26, 2019), which is a 35 U.S.C. § 371 National Stage of International Application No. PCT/SE2014/050994, filed Aug. 28, 2014. The above identified applications and publication are incorporated by this reference.

TECHNICAL FIELD

Embodiments herein relate to a network node and a method therein. In particular, it relates to a method for managing transmission of Cell Reference Symbols.

BACKGROUND

Communication devices such as User Equipments (UEs) are enabled to communicate wirelessly in a cellular communications network or wireless communication system, sometimes also referred to as a cellular radio system or cellular networks. The communication may be performed e.g. between two UEs, between a UE and a regular telephone and/or between a UE and a server via a Radio Access Network (RAN) and possibly one or more core networks, comprised within the cellular communications network.

UEs may further be referred to as wireless terminals, mobile terminals and/or mobile stations, mobile telephones, cellular telephones, laptops, tablet computers or surf plates with wireless capability, just to mention some further examples. The UEs in the present context may be, for example, portable, pocket-storable, hand-held, computer-comprised, or vehicle-mounted mobile devices, enabled to communicate voice and/or data, via the RAN, with another entity, such as another wireless terminal or a server.

The cellular communications network covers a geographical area which is divided into cell areas, wherein each cell area being served by a network node. A cell is the geographical area where radio coverage is provided by the network node.

The network node may further control several transmission points, e.g. having Radio Units (RRUs). A cell can thus comprise one or more network nodes each controlling one or more transmission/reception points. A transmission point, also referred to as a transmission/reception point, is an entity that transmits and/or receives radio signals. The entity has a position in space, e.g. an antenna. A network node is an entity that controls one or more transmission points. The network node may e.g. be a base station such as a Radio Base Station (RBS), eNB, eNodeB, NodeB, B node, or BTS (Base Transceiver Station), depending on the technology and terminology used. The base stations may be of different classes such as e.g. macro eNodeB, home eNodeB or pico base station, based on transmission power and thereby also cell size.

Further, each network node may support one or several communication technologies. The network nodes communicate over the air interface operating on radio frequencies with the UEs within range of the network node. In the context of this disclosure, the expression Downlink (DL) is used for the transmission path from the base station to the mobile station. The expression Uplink (UL) is used for the transmission path in the opposite direction i.e. from the UE to the base station.

In 3rd Generation Partnership Project (3GPP) Long Term Evolution (LTE), base stations, which may be referred to as eNodeBs or even eNBs, may be directly connected to one or more core networks. In LTE the cellular communication network is also referred to as E-UTRAN.

An E-UTRAN cell is defined by certain signals which are broadcasted from the eNB. These signals contain information about the cell which can be used by UEs in order to connect to the network through the cell. The signals comprise reference and synchronization signals which the UE uses to find frame timing and physical cell identification as well as system information which comprises parameters relevant for the whole cell.

A UE needing to connect to the network must thus first detect a suitable cell, as defined in 3GPP TS 36.304 v11.5.0. This is performed by measuring on received reference signals sent by neighboring cells, also referred to as "listening" for a suitable cell. The suitable cell is commonly the cell with best quality of signal. Listening for a suitable cell may comprise searching for reference signals transmitted from the network node in an OFDM subframe. When a suitable cell is found the UE performs random access, according to a system information for the cell. This is done in order to transmit a Radio Resource Control (RRC) connection setup request to the network node. Assuming the random access procedure succeeds and the network node receives the request, the network node will either answer with an RRC connection setup message, which acknowledges the UEs request and tells it to move into RRC connected state, or an RRC connection reject, which tells the UE that it may not connect to the cell. In RRC connected state the parameters necessary for communication between the network node and the UE are known to both entities and a data transfer between the two entities is enabled.

To facilitate handover to other cells, each network node may store cell identities that are supported by the other network nodes in an address database, in order to know how to contact the network node of potential target cells for handover. Each network node serving a cell typically stores in the data base which cells it has neighbor relations to, i.e. which of the cells in the area UEs often perform handover to. The cell's neighbor relations will hereafter be referred to as the cell's "neighbor relation list".

Cell specific Reference Signals (CRS) are UE known symbols that are inserted in a Resource Element (RE) of a subframe of an Orthogonal Frequency-Division Multiplexing (OFDM) time and frequency grid and broadcasted by the network node. Each RE has an extension in the frequency domain corresponding to an OFDM sub carrier and an extension in the time-domain corresponding to an OFDM symbol interval.

The CRS are used by the UE for downlink channel estimation. Channel estimation is used for demodulation of downlink data both when the UE is in RRC connected state and is receiving user data and when the UE is in RRC idle state and is reading system information. Due to the latter use case, the CRSs must be transmitted even from cells which do not have any UEs in RRC connected state since the eNB cannot know whether a UE wants to access the network until it performs random access. Downlink cell specific reference signals are inserted within the first and third last OFDM symbol of each slot with a frequency domain spacing of six sub-carriers. A slot is a time period of the OFDM time and frequency grid, which is usually 0.5 msec long. A problem with the known technology is therefore that cells without any UEs in RRC connected state still consume power due to CRS broadcasting.

In case several antennas are used by the network node for transmitting and each antenna is representing a cell, each antenna has to transmit a unique reference signal in order for the UE to connect to that specific cell. When one antenna transmits, the other antennas have to be silent in order not to interfere with the first antennas reference signal. To reduce the interference of reference signals between the cells, the position of the CRS is usually shifted in frequency between the cells. The CRS can be shifted between 0-5 sub carriers, each sub carrier corresponding to a frequency shift of 15 kHz for LTE. The cell specific frequency shift can be derived from the physical Cell Identity (Cell ID) which is signaled to the UE by selection of appropriate Primary Synchronization Channel (PSCH) and Secondary Synchronization Channel (SSCH).

Although this reduces the interference of reference symbols between cells, it has the problem that the reference symbols of one cell will disturb Physical Downlink Shared Channel (PDSCH) and Physical Downlink Control Channel (PDCCH) symbols of neighboring cells.

Hence, even though cells do not have any UEs in RRC connected state, disturbance may impact UE DL throughput in neighboring cells. This will especially be the case when the UE is in and/or close to borders between cells.

Reducing the power of the CRS may mitigate this problem. However, in order to access a cell the UE must be able to hear the CRS of the cell, i.e. the UE must be able to recognize and receive the CRS transmitted from the cell. Therefore reducing the power of the CRS also shrinks the size of the cell, since more distant UEs no longer will hear the CRS. Furthermore, the quality of the channel estimates used for demodulation decreases when the Signal to Interference Ratio (SINR) on the CRS decreases. Reducing the power of the CRS therefore causes degradation of cell edge performance. This degradation is further aggravated when the load in the network increases, especially if the data is transmitted with higher power than the CRS, which is usually the case when the effect of CRS interference is to be reduced.

SUMMARY

It is therefore an object of embodiments herein to enhance the performance in a wireless communications network.

According to a first aspect of embodiments herein, the object is achieved by a method performed by a network node for managing transmission of Cell Reference Symbols, CRS. The network node operates one or more cells and is configured to transmit the CRS in a first bandwidth mode. When a first cell is identified, which first cell is not actively serving any UEs, the network node applies a reduced CRS bandwidth mode on CRS which are transmitted in the first cell. In the reduced bandwidth mode the bandwidth is reduced in relation to the first bandwidth mode.

According to a second aspect of embodiments herein, the object is achieved by a network node for performing the method for managing transmission of Cell Reference Symbols, CRS. The network node operates at least one cell and is configured to transmit the CRS in a first bandwidth mode. The network node is configured to identify a first cell, which first cell is not actively serving any UEs. The network node further is configured to apply a reduced CRS bandwidth mode on CRS which are transmitted in the first cell, in relation to the first bandwidth mode.

By applying a reduced bandwidth mode on CRS in cells that do not serve any UEs in RRC connected mode, the power consumption and the interference from empty cells can be reduced, thereby enhancing the performance of cells that have UEs in RRC connected mode.

BRIEF DESCRIPTION OF THE DRAWINGS

Examples of embodiments herein are described in more detail with reference to attached drawings in which.

DETAILED DESCRIPTION

Figure 1:
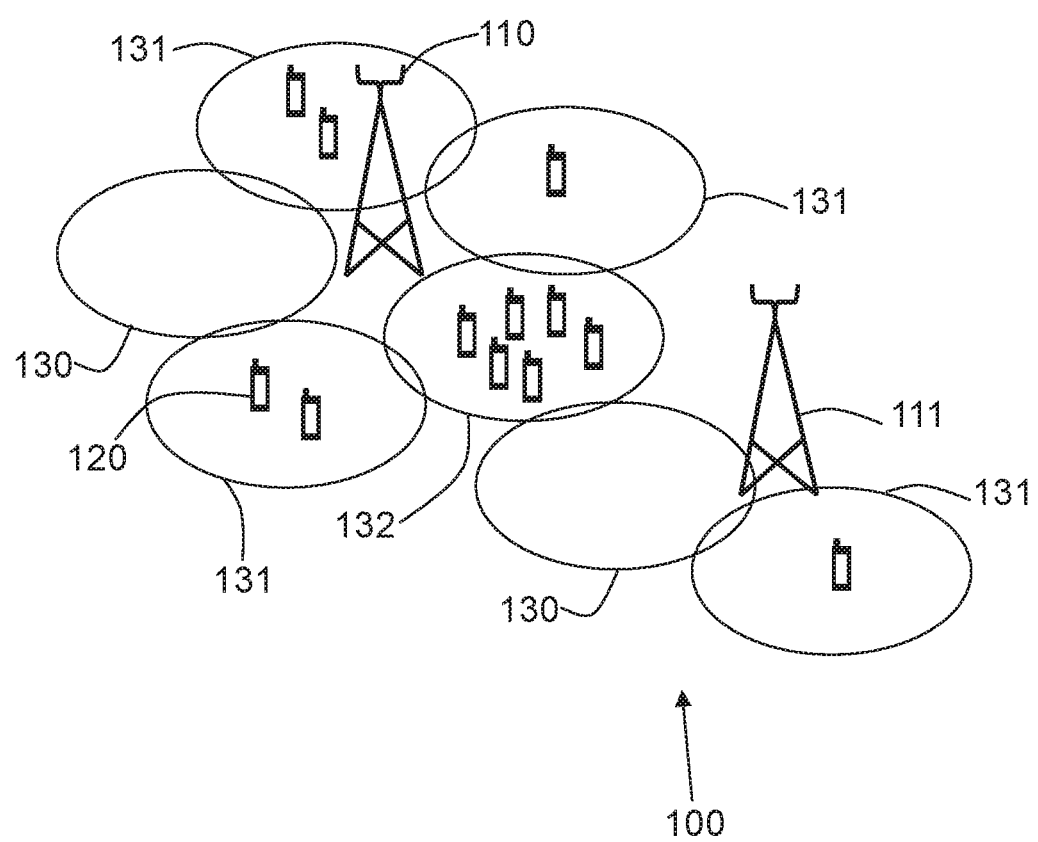
FIG. 1 is a schematic block diagram illustrating embodiments of a wireless communications network.

FIG. 1 depicts an example of a wireless communications network 100 according to a first scenario in which embodiments herein may be implemented. The wireless communications network 100 is a wireless communication network such as an LTE, E-Utran, WCDMA, GSM network, any 3GPP cellular network, Wimax, or any cellular network or system.

The wireless communications network 100 comprises a plurality of network nodes whereof two, a first network node 110 and a second network node 111 are depicted in FIG. 1. The first network node 110 and the second network node 111 are network nodes which each may be a transmission point such as a radio base station, for example an eNB, an eNodeB, or an Home Node B, an Home eNode B or any other network node capable to serve a wireless terminal such as a user equipment or a machine type communication device in a wireless communications network. The first network node 110 and the second network node 111 each serves a plurality of cells 130, 131, 132.

The wireless communications network 100 comprises a UE 120. The first network node 110 and the second network node 111 may each be a transmission point for the wireless terminal 120. The UE 120 is within radio range of the first network node 110 and the second network node 111, this means that it can hear signals from the first network node 110 and the second network node 111.

The UE 120 may e.g. be a wireless terminal, a wireless device, a mobile wireless terminal or a wireless terminal, a mobile phone, a computer such as e.g. a laptop, a Personal Digital Assistant (PDA) or a tablet computer, sometimes referred to as a surf plate, with wireless capability, or any other radio network units capable to communicate over a radio link in a wireless communications network. Please note the term wireless terminal used in this document also covers other wireless devices such as Machine to machine (M2M) devices.

Figure 2:
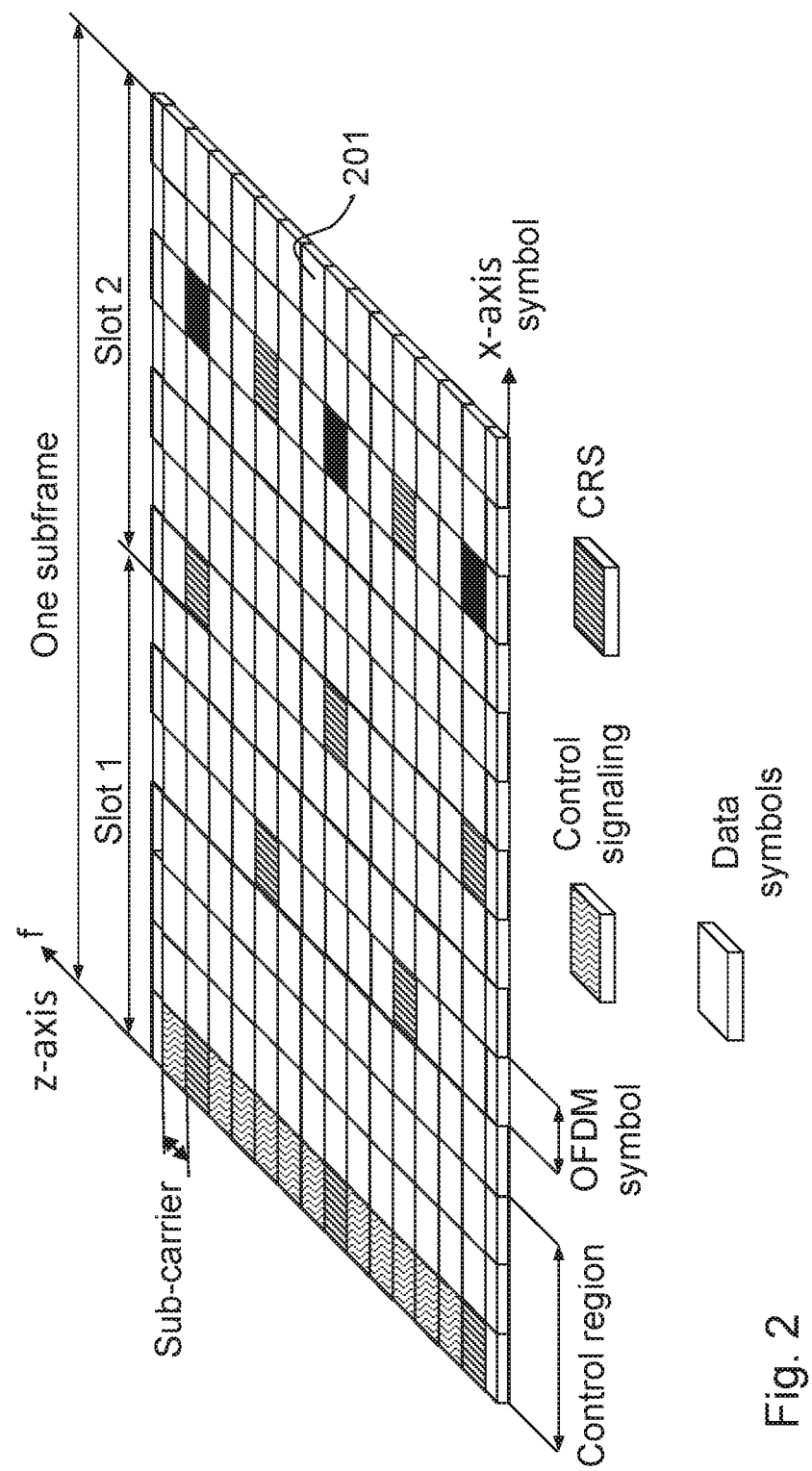
FIG. 2 is a schematic block diagram illustrating embodiments of an OFDM subframe.

FIG. 2 shows an exemplary downlink OFDM time and frequency grid, which is also referred to as an OFDM subframe. Each subframe comprises two slots. Each slot comprising a number of resource elements (RE) 201 extending both in the time domain (x-axis) and in the frequency domain (z-axis). Each RE's 201 extension in the frequency domain is referred to as a sub-carrier whereas the extension in the time domain is referred to as an OFDM symbol. In the time domain, LTE downlink transmissions are organized into radio frames of 10 ms, wherein each radio frame comprises ten equally-sized subframes. Furthermore, the resource allocation in LTE is typically described in terms of Physical Resource Blocks (PRBs), comprising a plurality of REs. A resource block corresponds to one slot in the time domain and 12 contiguous subcarriers in the frequency domain.

Downlink and uplink transmissions are dynamically scheduled, i.e. in each subframe the network node 130 transmits control information about to or from which UE 120 data is transmitted and upon which resource blocks the data is transmitted. The control information may comprise system information, paging messages and/or random access response messages. The control information for a given UE 120 is transmitted using one or multiple Physical Downlink Control Channels (PDCCH). Control information of a PDCCH is transmitted in the control region of each subframe. FIG. 2 shows an exemplary size of a normal control region of three OFDM symbols allocated for control signalling, for example the PDCCH. The size of the control region may however be dynamically adjusted according to the current traffic situation. In the example shown in the figure only the first OFDM symbol out of the three possible is used for control signalling. Typically the control region may comprise many PDCCHs carrying control information to multiple UEs 120 simultaneously. The REs used for control signaling are indicated with wave-formed lines and REs used for CRS are indicated with diagonal lines.

The CRS are used by the UE 120 for downlink channel estimation. Channel estimation is used for determining the demodulation of downlink data both when the UE 120 is in RRC connected state and is receiving user data and when the UE 120 is in RRC idle state and is reading system information. Downlink CRS are inserted within the first and third last OFDM symbol of each slot with a frequency domain spacing of six sub-carriers.

The subframe also comprises data symbols used for transmitting user data between the network node 110 and the UE 120. The data symbols are situated in the region following the control region, which is also referred to as the data region.

Example of embodiments of a method in the network node 110 for managing transmission of Cell Reference Symbols, CRS, will now be described with reference to a flowchart depicted in FIG. 3. The network node 110 operates one or more cells and is configured to transmit the CRS in a first bandwidth mode during operation. This relates to normal operation. The first bandwidth mode may also be referred to as the normal bandwidth mode which is used when the at least one cell of the network node 110 is serving at least one UE 120 in RRC connected mode. In the normal bandwidth mode CRS are transmitted over the entire available bandwidth of a DL Radio Frame (RF), i.e. CRS are transmitted in all Physical Resource Blocks (PRBs) of the cell.

The method comprises the following actions, which actions may be taken in any suitable order. Dashed lines of a box in FIG. 3 indicate that this action is not mandatory.

Action 301

The network node 110 identifies a first cell 130 which is not actively serving any UEs 120. When the cell is not actively serving any UEs 120, the cell is referred to as an empty cell. The cell is not actively serving any UEs 120 when the network node 110 has not sent or received any messages to/from any UEs 120 in the cell within a predetermined time, and/or when the cell does not have any UEs 120 in RRC connected mode.

The cell may switch from not actively serving any UEs 120 to actively serving UEs in case of certain events. Events that trigger a switch may e.g. be that the network node 110 sends a page message in the cell 130, receives a random access preamble in the cell 130 or sends a random access response in the cell 130. It may further be triggered when the network node sends/receives Common Control Channel messages, Dedicated Control Channel messages and/or Dedicated Traffic Channel messages in the cell 130.

Action 302

When the network node 110 has identified a first cell 130 which is not actively serving any UEs 120, i.e. an empty cell 130, the network node 110 applies a reduced bandwidth mode in the first cell 130. In the reduced bandwidth mode the bandwidth is reduced in relation to the first bandwidth mode. This reduced bandwidth mode may also be referred to as low bandwidth mode. Low bandwidth mode means that the network node 110 is not transmitting CRS in all PRBs of the cell. By reducing the bandwidth of the CRS, i.e. only transmitting CRS on a part of the available bandwidth of the DL RF, the overall interference of the CRS from the empty cell 130 is reduced. Reducing the interference from the empty cell 130 increases the throughput in cells 131, 132 with RRC connected UEs 120 is increased.

In one embodiment herein, the reduced CRS bandwidth mode is applied on CRS which are sent in any subframe, except in subframes where the network node 110 transmits system information, paging or random access response messages or subframes where the network node 110 assumes a UE 120 to perform measurements. This is usually the case in the first subframe of the DL RF, however this information may also be sent in other subframes. By applying the reduced CRS bandwidth mode in all subframes except the ones mentioned above, the interference by the CRS is reduced while at the same time allowing UEs 120 in neighboring cells 131, 132 to hear the CRS from the empty cell 130. This is required in order for the UE 120 to get information about the modulation of the signal, in order to be able to demodulate the downlink control channel of the cell. In this embodiment the network node 110 may send CRS over the entire bandwidth of the subframe in which the network node 110 transmits system information, paging or random access response messages or assumes UE 120 to perform measurements.

In another embodiment herein the network node 110 applies the reduced CRS bandwidth mode on CRS which are sent in any subframe, except in the first OFDM symbol of a subframe in which the network node 110 transmits system information, paging or random access response messages or assumes UE 120 to perform measurements. In this embodiment the network node 110 sends CRS over the entire bandwidth of the first OFDM symbol of the subframe in which the network node 110 transmits system information, paging or random access response messages or assumes UE 120 to perform measurements. This has the benefit that the interference from the empty cell 130 is reduced over a large portion of the time domain, while still allowing the UE 120 to hear the CRS from the empty cell 130 over the entire bandwidth in OFDM symbols where the UE 120 is supposed to listen for CRS.

In a further embodiment herein the network node 110 sends CRS only in PRBs which are used for transmission of data or control information in the subframe in which the network node 110 transmits system information, paging or random access response messages or assumes UE to perform measurements.

The network node 110 may also send CRS only in REs, which are adjacent to REs which are mapped to a common search space of PDCCH. Thereby CRS are sent only in areas where the UE is looking for PDCCH.

The network node 110 holds the reduced CRS bandwidth mode as long as the cell 130 is determined not to actively serve any UEs 120. As soon as the cell is actively serving a UE 120, the network node 130 switches to the normal bandwidth mode, thereby transmitting CRS over the entire bandwidth of the subframes.

The CRS bandwidth may further be adapted in several levels. For LTE, the bandwidth in the cell 130 may e.g. be varied in levels between 1.4 to 20 Mhz. However, depending on the technology used also other bandwidths may be possible.

In a further embodiment a hysteresis function may be applied when changing CRS bandwidth level, thereby avoiding unnecessary switching between the bandwidth modes when the cell 130 is switching from not actively serving any UEs 120 to actively serving UEs 120 very quickly.

Figure 3:
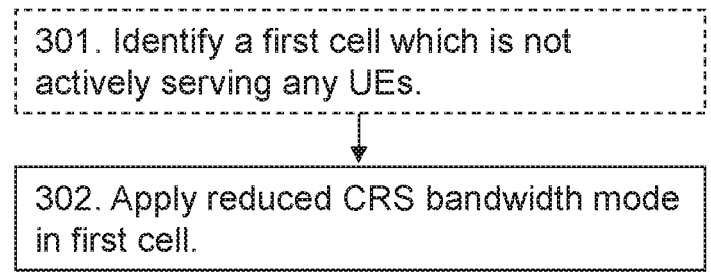
FIG. 3 is a flowchart depicting embodiments of a method in a network node.
Figure 4:
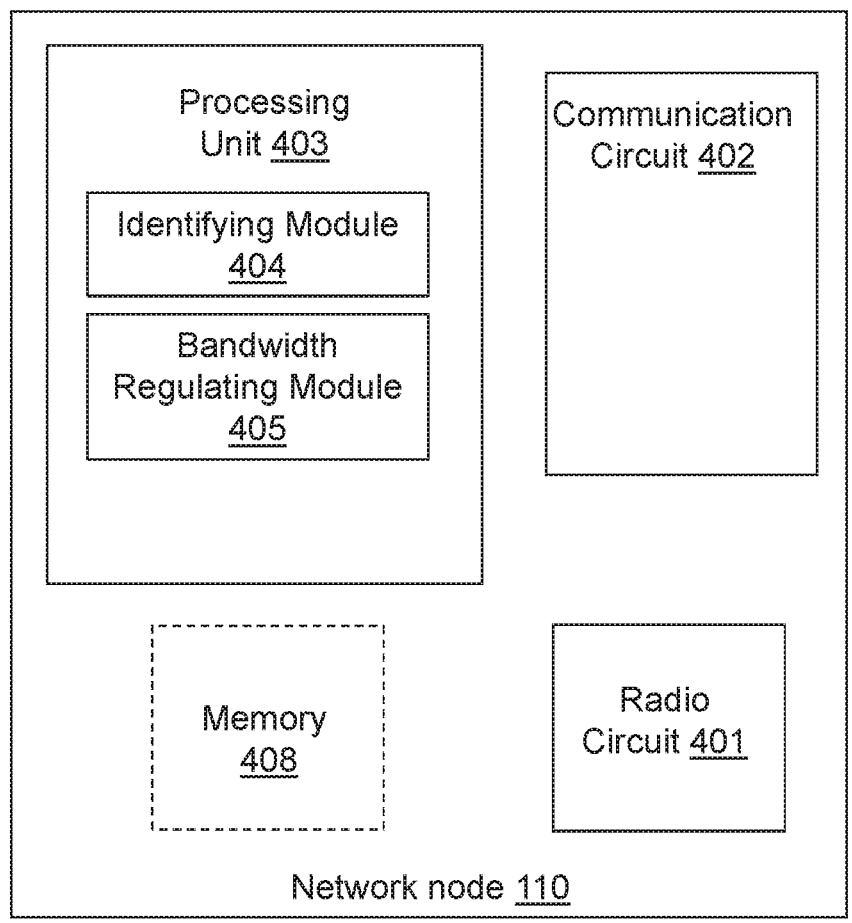
FIG. 4 is a schematic block diagram illustrating embodiments of a network node.

To perform the method actions for managing transmission of CRS described above in relation to FIG. 3, the network node 110 may comprise the following arrangement depicted in FIG. 4. As mentioned above the network node 110 operates one or more cells and is normally configured to transmit the CRS in a first bandwidth mode.

The network node 110 comprises a radio circuitry 401 to communicate with UEs 120, a communication circuitry 402 to communicate with other network nodes and a processing unit 403.

The network node 110 is configured to, e.g. by means of an identifying module 404 being configured to, identify a first cell 130 that is not actively serving any UEs 120. The network node 110 is further configured to, or comprises a bandwidth regulating module 405 configured to, apply a reduced CRS bandwidth mode of the CRS in the first cell 130 in relation to the first bandwidth mode, when a first cell is identified not to actively serve any UEs 120.

The network node 110 may further be configured to, e.g. by means of a bandwidth regulating module 405 further being configured to, apply the reduced CRS bandwidth mode on CRS which are sent in any subframe, except in a subframe where the network node 110 transmits system information, paging or random access response messages or assumes UE 120 to perform measurements. In this embodiment the network node 110 may further be configured to, e.g. by means of a bandwidth regulating module 405 being further configured to, send CRS over the entire bandwidth of the subframe in the subframe in which the network node 110 transmits system information, paging or random access response messages or assumes UE 120 to perform measurements.

In another embodiment herein the network node 110 may further be configured to, e.g. by means of a bandwidth regulating module 405 further being configured to, apply the reduced CRS bandwidth mode on CRS which are sent in any subframe, except in the first OFDM symbol of a subframe in which the network node 110 transmits system information, paging or random access response messages or assumes UE 120 to perform measurements. In this embodiment the network node 110 may further be configured to, e.g. by means of an bandwidth regulating module 405 being further configured to, send CRS over the entire bandwidth in the first OFDM symbol of the subframe in which the network node 110 transmits system information, paging or random access response messages or assumes UE 120 to perform measurements.

The network node 110 may further be configured to, e.g. by means of a bandwidth regulating module 405 further being configured to, send CRS only in PRBs which are used for transmission in the subframe in which the network node 110 transmits system information, paging or random access response messages or assumes UE 120 to perform measurements.

In embodiments herein, the network node 110 may further be configured to, e.g. by means of a bandwidth regulating module 405 further being configured to, send CRS only in REs which are adjacent to REs which are mapped to a common search space of the PDCCH. The common search space comprises the REs used by the network node 110 for sending control information which is common for all UEs 120.

In order to reduce unnecessary switching between the bandwidth modes, the network node 110 may further be configured to, or may comprise the bandwidth regulating unit 405 further being configured to reduce and/or increase the CRS bandwidth using a hysteresis function. By using a hysteresis function the network node 110 may not switch bandwidth mode immediately when the number of connected UEs 120 changes, but will remain in one bandwidth mode for a certain amount of time after the change of connected UEs 120 in the cell has taken place.

The embodiments herein for managing transmission of Cell Reference Symbols, (CRS) may be implemented through one or more processors, such as the processing unit 403 in the network node 110 depicted in FIG. 3, together with computer program code for performing the functions and actions of the embodiments herein. The program code mentioned above may also be provided as a computer program product, for instance in the form of a data carrier carrying computer program code for performing the embodiments herein when being loaded into the in the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 406 comprising one or more memory units. The memory 406 is arranged to be used to store obtained information, measurements, data, configurations, schedulings, and applications to perform the methods herein when being executed in the network node 110.

Those skilled in the art will also appreciate that the identifying module 404 and bandwidth regulating module 405 described above may refer to a combination of analog and digital circuits, and/or one or more processors configured with software and/or firmware, e.g. stored in the memory 406, that when executed by the one or more processors such as the processing unit 403 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed by a network node for managing transmission of Cell Reference Symbols (CRS), the method comprising:
applying, in a first cell, a first CRS bandwidth mode with respect to a first subframe having a bandwidth;
determining that the first cell is not actively serving any user equipments (UEs); and
after determining that the first cell is not actively serving any UEs, applying, in the first cell, a second CRS bandwidth mode with respect to a second subframe having the same bandwidth as the first subframe, wherein
in the second CRS bandwidth mode the number of CRS transmissions is reduced in relation to the first CRS bandwidth mode.

2. The method of claim 1, further comprising, as a result of determining that the first cell is not actively serving any UEs and before applying the second CRS bandwidth mode on CRS which are transmitted in the first cell, determining whether or not to apply the second CRS bandwidth mode with respect to a particular subframe, wherein determining whether or not to apply the second CRS bandwidth mode with respect to the particular subframe comprises determining: i) whether system information will be transmitted in the first cell during the particular subframe and ii) whether a paging response or random access response will be transmitted in the first cell during the particular subframe.

3. The method of claim 1, wherein the network node sends CRS over the entire bandwidth of the subframe in which the network node transmits system information, paging or random access response messages or assumes UE to perform measurements.

4. The method of claim 1, wherein the second CRS bandwidth mode is applied on CRS which are sent in any subframe, except in the first OFDM symbol of a subframe in which the network node transmits system information, paging or random access response messages or assumes UE to perform measurements.

5. The method of claim 4, wherein the network node sends CRS over the entire bandwidth of the first OFDM symbol of the subframe in which the network node transmits system information, paging or random access response messages or assumes UE to perform measurements.

6. The method of claim 1, wherein the network node sends CRS only in Physical Resource Blocks (PRBs) that are used for transmission in the subframe in which the network node transmits system information, paging or random access response messages or assumes UE to perform measurements.

7. The method of claim 1, wherein the network node sends CRS only in resource elements (REs) which are adjacent to REs which are mapped to a common search space of PDCCH.

8. The method of claim 7, wherein the second CRS bandwidth mode is applied on CRS which are sent in any subframe, except in subframes in which the network node transmits system information, paging or random access response messages or assumes the UE to perform measurements.

9. A network node for performing a method for managing transmission of Cell Reference Symbols (CRS), the network node being configured to:
apply, in a first cell, a first CRS bandwidth mode with respect to a first subframe having a bandwidth;
determine that the first cell is not actively serving any user equipments (UEs); and
after determining that the first cell is not actively serving any UEs, applying, in the first cell, a second CRS bandwidth mode with respect to a second subframe having the same bandwidth as the first subframe, wherein
in the second CRS bandwidth mode the number of CRS transmissions is reduced in relation to the first CRS bandwidth mode.

10. The network node of claim 9, wherein the network node further is configured such that, as a result of determining that the first cell is not actively serving any UEs and before applying the second CRS bandwidth mode on CRS which are transmitted in the first cell, the network node determines whether or not to apply the second CRS bandwidth mode with respect to a particular subframe, wherein the network node is configured to determine whether or not to apply the second CRS bandwidth mode with respect to the particular subframe by performing a procedure that comprises: i) determining whether system information will be transmitted in the first cell during the particular subframe and ii) determining whether a paging response or random access response will be transmitted in the first cell during the particular subframe.

11. The network node of claim 9, wherein the network node further is configured to send CRS over the entire bandwidth of the subframe in which the network node transmits system information, paging or random access response messages or assumes UE to perform measurements.

12. The network node of claim 9, wherein the network node further is configured to:
apply the second CRS bandwidth mode on CRS which are sent in any subframe, except in the first OFDM symbol of a subframe in which the network node transmits system information, paging or random access response messages or assumes UE to perform measurements.

13. The network node of claim 12, wherein the network node further is configured to:
send CRS over the entire bandwidth in the first OFDM symbol of the subframe in which the network node transmits system information, paging or random access response messages or assumes UE to perform measurements.

14. The network node of claim 9, wherein the network node further is configured to:
send CRS only in Physical Resource Blocks (PRBs) that are used for transmission in the subframe in which the network node transmits system information, paging or random access response messages or assumes UE to perform measurements.

15. The network node of claim 9, wherein the network node is configured to:
send CRS only in resource elements (REs) which are adjacent to REs which are mapped to a common search space of PDCCH.

16. The network node of claim 9, wherein the network node is configured to apply the second CRS bandwidth mode on CRS which are sent in any subframe, except in subframes in which the network node transmits system information, paging or random access response messages or assumes the UE to perform measurements.

* * * * *